3,296,177
STOPPING AGENTS FOR SYNTHETIC RUBBER POLYMERIZATION
Paul Gordon Haines, Lafayette Hills, Alfred Case Whiton, Blue Bell, and Harry Elmer Albert, Lafayette Hills, Pa., assignors to Pennsalt Chemicals Corporation, Philadelphia, Pa., a corporation of Pennsylvania
No Drawing. Filed Nov. 13, 1964, Ser. No. 411,145
7 Claims.  (Cl. 260—29.7)

This invention relates to an improved process for shortstopping polymerization processes, and is particularly concerned with those polymerization processes for making synthetic rubber latices, such as butadiene-styrene copolymers.

Synthetic rubber latices are prepared commercially by emulsion polymerization of rubber forming monomers and the polymerization must be stopped to get a product of the desired optimum characteristics. Much study has been made toward finding good short-stops and numerous compounds have been found quite useful. However, the compounds used heretofore have certain disadvantages and are not generally satisfactory with all types of polymerization systems. Hydroquinone, for example, has been used in hot butadiene-styrene systems, but it is not satisfactory as a short-stop in cold rubber polymerization processes where a more powerful initiator, as for example, a hydroperoxide, is used. Dinitrochlorobenzene has been used in cold rubber processes, but it has the severe disadvantage of causing discoloration of the rubber and it is also water insoluble and quite toxic to workers in the plant. Alkali metal salts, such as the sodium salts of dithiocarbamates, and particularly sodium dimethyldithiocarbamate, have been used quite successfully in both hot and cold polymerization recipes, but such compounds have the disadvantage of causing some polymer discoloration and of being oxidized to a thiuramdisulfide which remains in the finished rubber and cauese undesirable and uncontrollable variation in vulcanization rate. Sodium dimethyldithiocarbamate has also been used in combination with sodium polysulfide, but this stopping agent combination also has many disadvantages such as line plugging due to incomplete water solubility and the combination also causes equipment corrosion and discoloration of the polymer product.

It has now been found that an extremely desirable stopping agent for both hot and cold emulsion polymerization systems is obtained by employing as stopping agent the bis-oxalate salt of an N-monoalkyl or an N,N-dialkylhydroxylamine. It has been found that bis(alkylhydroxylamine) oxalates are very active stopping agents particularly for styrene-butadiene polymerization, being effective at concentrations far below those used in commercial practice. They are completely water soluble and are not a source of equipment corrosion or discoloration of the rubber product.

It is surprising that the oxalate salts as described above are active stopping agents because related organic acid salts such as the acetate, citrate and the like, are much inferior in short-stopping activity.

As indicated above the alkylhydroxylamines which are useful in the invention will be those having the structure

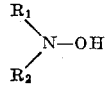

where $R_1$ is a member selected from the group consisting of hydrogen, alkyl, and cycloalkyl, $R_2$ is a member of the group consisting of alkyl and cycloalkyl, and wherein the organic $R_1$ and $R_2$ groups contain up to about 6 carbon atoms. Thus, specific compounds which are operable in the invention will include N-methylhydroxylamine, N,N - dimethylhydroxylamine, N - ethylhydroxylamine, N,N - diethylhydroxylamine, N,N - diisopropylhydroxylamine, N,N - dibutylhydroxylamine, N-butylhydroxylamine, N-malhydroxylamine, N-hexylhydroxylamine, N-cyclohexylhydroxylamine, N,N-dicyclohexylhydroxylamine, N,N-diamylhydroxylamine, N-methyl, N-ethylhydroxylamine, N-methyl, N-cyclohexylhydroxylamine and the like.

These hydroxylamines are known and may be prepared by any one of several known methods, as, for example, by converting the appropriate tertiary amine to the amine oxide and pyrolyzing the oxide to the N,N-dialkylhydroxylamine as disclosed by Cope et al. in Journal American Chemical Society, vol. 79, page 964 (1957). N-cycloaliphatichydroxylamines such as N-cyclohexyldroxylamine and its related compounds may be prepared by the method described in Canadian Patent 588, 865, issued December 15, 1959.

In order to convert the above alkyldroxylamines to the bis-oxalate salts the desired N-substituted hydroxylamine (generally as an aqueous solution) is simply mixed with an oxalic acid solution, the amounts of reagents being essentially stoichiometric so as to give the bis- compound. The resulting product is a clear solution which if it contains no more than about 35% by weight of bis-oxalate is stable to storage and may be used as the stopping agent in the emulsion polymerization process directly or at lower concentrations simply by dilution with water.

Bis(N-alkylhydroxylamine) oxalates are also readily prepared by the reduction of the corresponding nitroalkane with hydrogen using a palladium-on-carbon catalyst in the presence of an equivalent weight of oxalic acid according to the general procedure described by Schmidt, Ascherl and Mayer, Ber. 58B 2430 (1925). The nitroalkanes, some of which are inexpensive commerical products, are obtained by nitration of paraffin hydrocarbons.

In carrying out the process of the invention, conventional polymerization recipes will be employed and the short-stop will be added in the usual manner. Hot synthetic rubber recipes (persulfate or azonitrile initiated) or cold synthetic rubber recipes (hydroperoxide initiated) may be used. The polymerizable material for preparing synthetic rubber latices will preferably be a butadiene based system, e.g. butadiene-1,3 together with a styrene or related styrene copolymer (e.g. alpha-methylstyrene). However, the short stopper used in this invention may be employed with any ethylenically unsaturated monomer system.

The amount of the bis-oxalate short-stop that will be used will vary from about 0.01 to 0.20 p.h.m. (parts for hundred parts of monomer). The manner by which the short-stop will be added will be in accord with conventional techniques used in rubber polymerization processes. Preferably an aqueous solution of the bis-oxalates as prepared will be added to the polymerization reaction mass when the desired conversion is obtained.

In order to illustrate the invention the following examples are given:

*Example 1—Preparation of oxalate solution*

Ten grams (0.10 mole) of a 90% aqueous N,N-diethylhydroxylamine was added to 20.0 g. deionized water and 4.5 g. (0.05) of oxalic acid was added. The mixture was cooled to 25° C. and at this temperature the least amount more of deionized water was gradually added with agitation until the salt crystals had dissolved. This required 8.6 g. more of water. The total amount of water was thus 28.6 g. plus 1.0 g. contained in the 90% solution of starting material. Thus, a concentration of 31% by weight of the bis-oxalate salt of N,N-diethylhydroxylamine was obtained.

Example 2

Evaluation is carried out by using an emulsion polymerization system contained in capped 7 oz. beverage bottles which were agitated at being turned end over end at a constant temperature bath by means of a rotating shaft. The test recipe was a standard styrene-butadiene rubber recipe having the following composition:

| Ingredients: | Quantity per 7 oz. bottle |
|---|---|
| Butadiene | 18 |
| Styrene | 7 |
| Deionized water | 50 |
| Dodecyl mercaptan | 0.058 |
| Potassium salt of disproportionated rosin acids ("Dresinate" 515) | 1.125 |
| Sodium salt of polymerized alkyl naphthalene sulfonate ("Daxad" 11) | 0.038 |
| Tetrasodium salt of ethylene diamine tetraacetic acid sequestering agent ("Versene" 100) | 0.008 |
| p-Menthane hydroperoxide | 0.011 |
| $Fe_2SO_4 \cdot 7H_2O$ | 0.0056 |
| $Na_3PO_4 \cdot 12H_2O$ | 0.20 |
| Sodium sulfoxylate formaldehyde | 0.0169 |

A load of bottles were tumbled at 5° C. in a polymerizer and when 55 to 60% conversion was reached the stopping agents were injected through a self-sealing synthetic rubber liner in the perforated cap. One bottle in each series was not stopped and served as a control. After injection of stopping agents into the bottles they were tumbled in the polymerizer for one more hour at 5° C. after which the latices were sampled for percent conversion. The bottles were then tumbled in the polymerizer at 50° C. and percent conversion for each bottle was determined after 18 hours and after 24 hours of heating. An effective stopping agent will stop polymerization of the recipe completely even during the extended period of heating at 50° C. for 24 hours.

The following table indicates the results of the same with various agents of the invention and with a related carboxylic acid salt.

TABLE I

| Stopping Agent | Concentration, p.h.m. | When stopped | Percent Conversion | | |
|---|---|---|---|---|---|
| | | | After 1 hr. at 5° C. | After 18 hours at 50° C. | After 24 hours at 50° C. |
| None | | 56.8 | | 92.8 | 93.3 |
| Bis(N-methylhydroxylamine) oxalate | 0.15 | 56.8 | 55.7 | 57.0 | 57.2 |
| Do | 0.02 | 56.8 | 48.0 | 57.4 | 55.0 |
| Bis(N-isopropylhydroxylamine) oxalate | 0.15 | 56.8 | 56.6 | 55.8 | 56.5 |
| Do | 0.02 | 56.8 | 56.7 | 56.5 | 55.0 |
| Bis(N,N-diethylhydroxylamine) oxalate | 0.02 | 55.7 | 54.8 | 59.0 | 59.0 |
| (N,N-diethylhydroxylamine) citrate | 0.02 | 57.8 | 59.1 | 77.7 | 78.5 |

Example 3

When the bis-oxalate of N-cyclohexylhydroxylamine is used at 0.10 p.h.m. in accord with the procedure of Example 2, excellent stopping activity is observed. This agent is also effective in a hot styrene-butadiene polymerization recipe.

It will be understood that numerous changes may be made from the above description and examples without departing from the spirit and scope of the invention.

We claim:

1. In the process of polymerizing an ethylenically unsaturated monomer and terminating the polymerization by the addition of a stopping agent, the improvement which comprises using as said stopping agent a bis-oxalate salt of an alkyl hydroxylamine having the structure

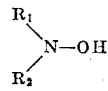

where $R_1$ is selected from the group consisting of hydrogen, alkyl, and cycloalkyl, and $R_2$ is selected from the group consisting of alkyl and cycloalkyl, and wherein the organic $R_1$ and $R_2$ groups contain up to about 6 carbon atoms.

2. In the process of preparing a butadiene based synthetic rubber latex the improvement which comprises stopping the polymerization with the bis-oxalate salt of an alkyl hydroxylamine of structure

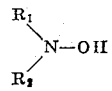

where $R_1$ is selected from the group consisting of hydrogen, alkyl and cycloalkyl, and $R_2$ is selected from the group consisting of alkyl and cycloalkyl, and wherein the organic $R_1$ and $R_2$ groups contain from one to six carbon atoms.

3. The process of claim 2 wherein the butadiene polymer is a copolymer of styrene and butadiene.

4. The process of claim 3 wherein the stopping agent is the bis-oxalate salt of N,N-diethylhydroxylamine.

5. The process of claim 3 wherein the stopping agent is the bis-oxalate salt of N-cyclohexylhydroxylamine.

6. The process of claim 3 wherein the stopping agent is bis(N-methylhydroxylamine) oxalate.

7. The process of claim 3 wherein the stopping agent is bis(N-isopropylhydroxylamine) oxalate.

No references cited.

MURRAY TILLMAN, *Primary Examiner.*

J. ZIEGLER, *Assistant Examiner.*